June 8, 1926.

C. R. YOUNG 1,587,813

LOADING COIL CASE

Filed Dec. 22, 1923

Inventor:
Charles R. Young
by E. W. Adams
Att'y.

Patented June 8, 1926.

1,587,813

UNITED STATES PATENT OFFICE.

CHARLES R. YOUNG, OF BLOOMFIELD, NEW JERSEY, ASSIGNOR TO WESTERN ELECTRIC COMPANY, INCORPORATED, OF NEW YORK, N. Y., A CORPORATION OF NEW YORK.

LOADING-COIL CASE.

Application filed December 22, 1923. Serial No. 682,221.

This invention relates to loading coil cases and particularly cases for loading coils of four-wire repeater circuits.

It has for its object the reduction of cross-talk.

Four-wire repeater circuits employ separate lines for transmitting signals in opposite directions, each line being supplied with one or more repeaters. When such lines are brought into close relationship with one another, as for example, when they are loaded by loading coils mounted in a common casing, troublesome cross-talk is very liable to be introduced. Cross-talk between the two circuits transmitting in opposite directions is the most objectionable since these two lines are transmitting at widely different energy levels, particularly in the neighborhood of repeater stations. Under this condition, cross-talk induced into the line at the lower level is very likely to be of the same order of magnitude as the signaling currents transmitted thereover.

In this description, the coils used to load the circuits which transmit signals in the two opposite directions will be referred to as the A and B group coils, respectively.

In Patent No. 1,394,062 granted to O. B. Blackwell October 18, 1921, it is proposed to mount the A and B group coils in separate magnetically shielded compartments. The connecting wires, however, are all located in one compartment so that it is necessary to shield the individual spindle cables, the shielding being carried back through the cable stub.

In accordance with this invention it is proposed to divide the entire casing into two separate compartments by means of a metallic partition. The A group coils are then mounted in one compartment and the B group coils in the other. The cable stub is brought into one compartment, the wires going to the coils in the other, being grouped together and shielded until after they pass into their compartment when they are divided into unshielded spindle cables.

This invention has a further advantage when auxiliary apparatus are mounted in the open space above the loading coils, as is proposed in a coopending application of Bandur, Serial No. 690,796, filed February 5, 1924. With this arrangement the upper portion of the casings contains the balancing coils and the connecting wires. With the use of my shielding partition, it is possible to satisfactorily limit the cross-talk when the balancing coils are so mounted.

Figure 1:
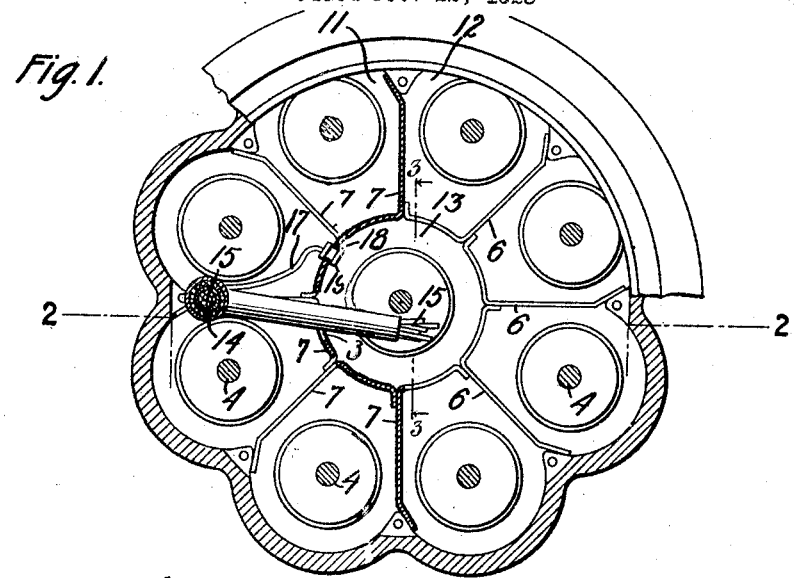
Figures 2, 3:
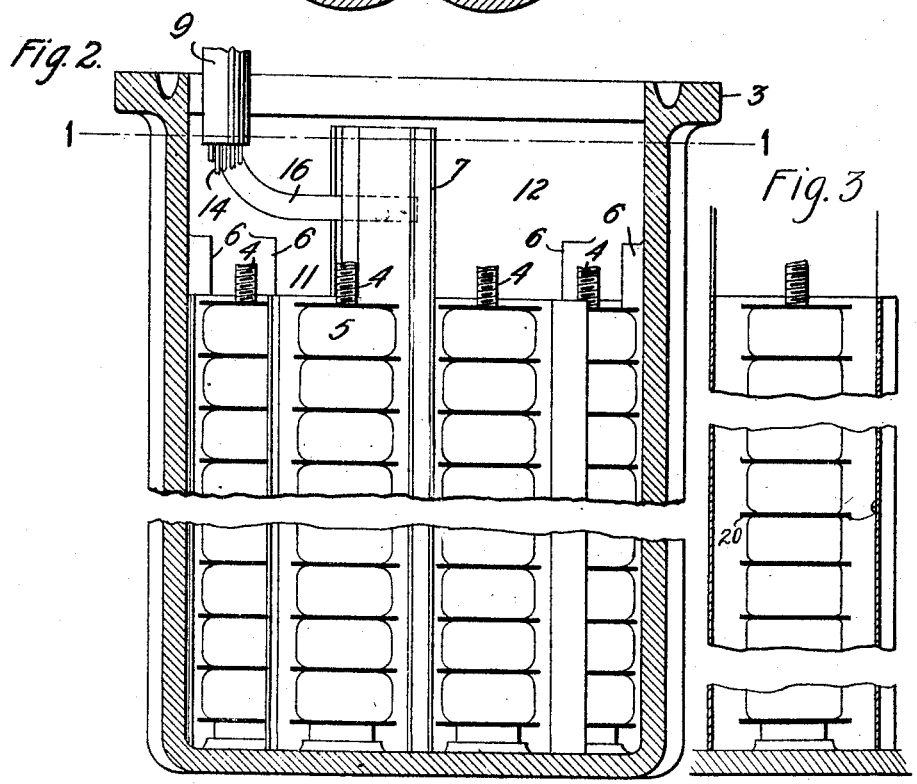

The invention will be clear from a consideration of the following description in connection with the drawing in which Fig. 1 is a horiztonal section of the case with the loading coils mounted therein the section being taken on line 1—1 of Fig. 2, Fig. 2 is a vertical section of the case on irregular line 2—2 of Fig. 1 and Fig. 3 is a partial section on line 3—3 of Fig. 1.

The case shown comprises an outer housing 3 in which are mounted a plurality of spindles 4 on which loading coils 5 are assembled before they are mounted in the casing. A plurality of partitions 6 and 7 are provided to divide the case into spindle compartments.

In accordance with this invention, certain of these partitions 7 are extended so that the complete case is divided into two main compartments 11 and 12. The A group coils are mounted in compartment 11 and the B group in 12. Since there are an odd number of compartments, it may be necessary to mount both A and B group coils in the center compartment 13 (Fig. 3). The A group coils, however, can be mounted in the lower portion of the compartment and separated from the B group coils by means of a grounded washer 20. The cable stub 9, comprising a shielded group of wires 15 around which are arranged the wires 14 leading to the other group of coils, enters the casing at a point in compartment 11. With the protection afforded by the partition, it is not necessary to provide all of the spindle cables with shielding. Instead those line conductors 14 which go to the A group coils can be left in the open, while the conductors 15 which go to the B group coils need only be supplied with a shield 16 of metallic tape for the short distance which they run through compartment 11. The shielded cable which they form is carried into compartment 12 through the slot 8 in the partition. The leads 17 which go to the A group coils mounted in the lower portion of compartment 13 are run through insulating bushings 19 placed in a slot 18 in the partition, and are run down on the side of the loading coils opposite to that on which the wires going to the B group coils are run.

While I have described this invention in connection with a particular type of casing having removable partitions, it is understood that it may be applied to other types without departing from the spirit of the invention as defined in the following claims.

What is claimed is:

1. A loading coil case comprising an outer housing having a space for receiving loading coils and their connections, and a partition extending above the coil receiving portion of said space into the connections receiving portion of said space, and substantially completely dividing said space into a plurality of electrostatically shielded compartments.

2. A loading coil case comprising an outer housing having a space for receiving loading coils and their connections, and a partition extending above the coil receiving portion of said space into the connections receiving portion of said space, and substantially completely dividing said space into a plurality of magnetically and electrostatically shielded compartments.

3. A loading coil case comprising an outer housing having a space for receiving loading coils and their connections, and a partition substantially completely dividing said space into several main compartments, said main compartments being subdivided into a plurality of magnetically and electrostatically shielded compartments.

4. A loading coil case having a space for receiving groups of loading coils, a space for receiving connections from the coils to the exterior of the case, and partitions of metallic material dividing said coil receiving space and said connecting wire receiving space into a plurality of compartments.

5. A loading coil case comprising an outer housing of magnetic material having a space for receiving groups of loading coils, a space for receiving connections leading from the coils to the exterior of the housing, partitions of metallic material dividing said coil receiving space into a plurality of compartments, and partitions of metallic material dividing said connecting wire receiving space into two compartments.

6. In combination, a case substantially completely divided into a plurality of magnetically and electrostatically shielded compartments, a group of loading coils mounted in one of said compartments, a group of loading coils mounted in a second one of said compartments, a group of conductors connected to said first mentioned group of loading coils and leading to the exterior of the case, a second group of conductors connected to said second group of loading coils and leading to the exterior of the case through said first mentioned compartment, and means for electrostatically shielding said second mentioned group of conductors for that portion of their length which they run through said first mentioned compartment.

In witness whereof, I hereunto subscribe my name this 18th day of December, A. D. 1923.

CHARLES R. YOUNG.